March 27, 1951 F. O. DE MILLAR 2,546,729
MAGNETIC MOTOR

Filed May 5, 1949 2 Sheets-Sheet 1

Inventor:
Floyd O. De Millar,
by Cravell S. Mack
His Attorney.

Patented Mar. 27, 1951

2,546,729

UNITED STATES PATENT OFFICE 2,546,729

MAGNETIC MOTOR

Floyd O. De Millar, Sherborn, Mass., assignor to Telechron, Inc., a corporation of Maine Application May 5, 1949, Serial No. 91,488

5 Claims. (Cl. 172—36)

My invention relates to direct current motors and, in particular, to small, inexpensive motors which may be operated from dry cells or storage batteries for the driving of toys, clock devices, and the like, and will be of sufficiently sturdy and simple construction as to withstand rough usage and vibration.

In carrying my invention into effect, I provide a stationary field structure, a portion of which furnishes a constant unidirectional flux and another portion of which furnishes an intermittent unidirectional flux. This field acts upon a polar rotor of magnetic material attracted to one rotative position by the constant field when the intermittent field is off, and to another rotative position by the intermittent field when the latter is on. The polar arrangement of field and rotor is such as to produce progressive rotation in one direction. In its preferred form the constant unidirectional field is furnished by a permanent magnet or magnets. The intermittent field is furnished by a simple electromagnet or electromagnets energized either through a commutator driven by the motor itself or by some separate current impulsing device, in which case the motor will function as a current impulse counter.

Figure 1:
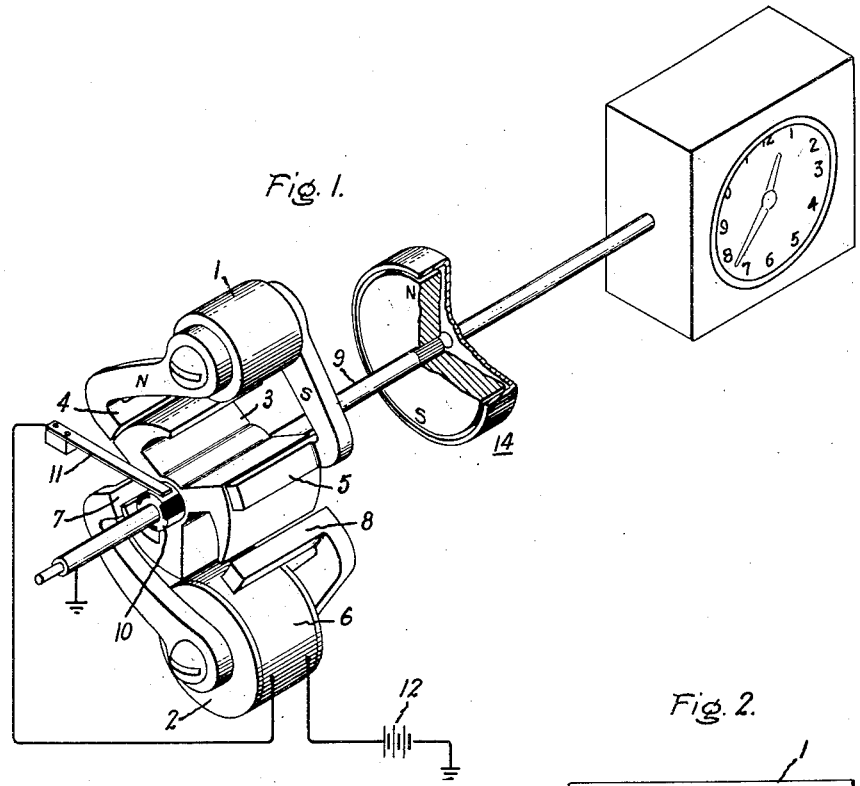
Figure 3:
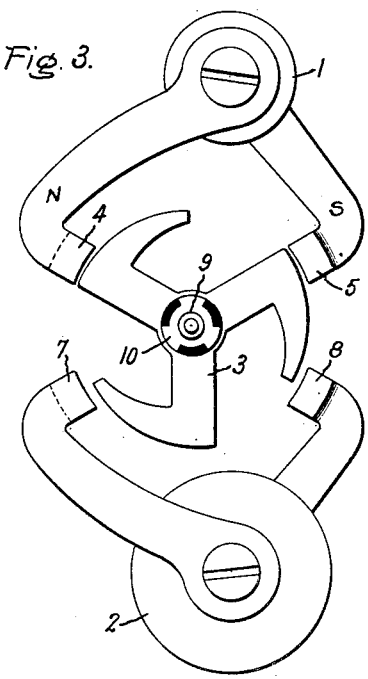
Figure 2:
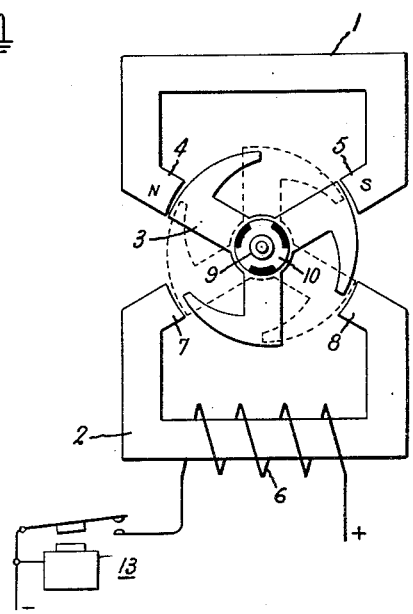
Figure 4:
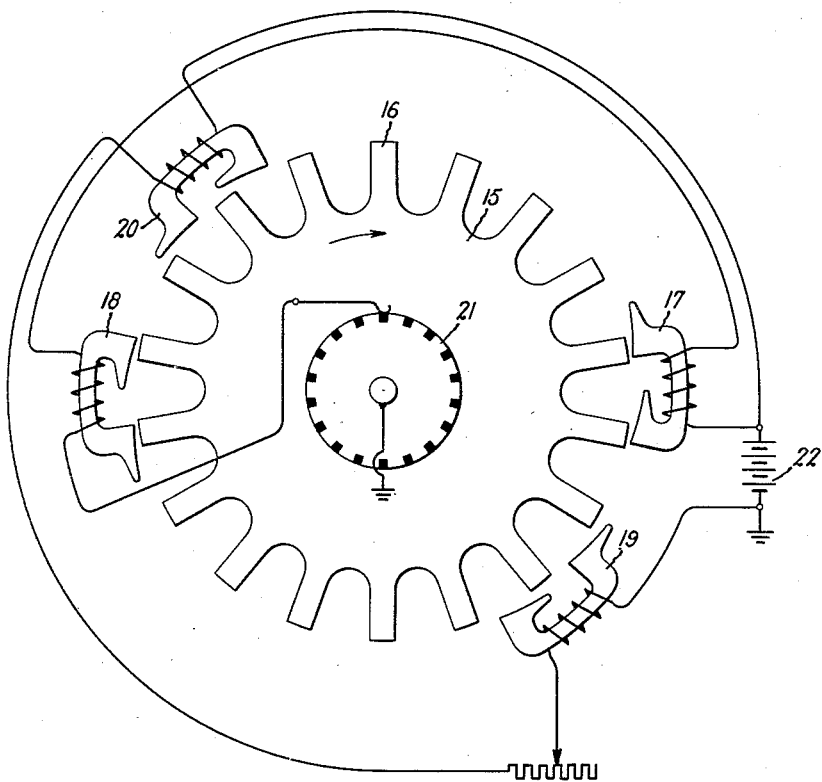

The features of my invention which are believed to be novel and patentable will be pointed out in the claims appended hereto. For a better understanding of my invention reference is made in the following description to the accompanying drawing in which Fig. 1 represents a perspective view of a preferred embodiment of my invention; Fig. 2 represents a schematic view of the motor of Fig. 1, and might also represent a modified construction of the motor; Fig. 3 represents an end view of the motor of Fig. 1 and Fig. 4 represents a modified form of my invention.

Referring now to Figs. 1 and 2, the stationary field structure of the motor consists of a stationary permanent magnet 1 and a stationary electromagnet 2, each having two pole pieces of opposite polarity, the pole pieces of the two magnets arranged in a circle in approximately the same plane, with the pole pieces of each magnet spaced apart on opposite sides of such circle 120 degrees and with a spacing between adjacent pole pieces of the different magnets of 60 degrees. Rotatively mounted in and concentric to the circle of stationary pole pieces is a magnetic rotor 3 having three spider arms terminating in sector-shaped tapered pole pieces with the tapered pole piece ends all extending in the direction of motor rotation. The three-pole rotor has its pole pieces symmetrically spaced 120 degrees apart and with the sector pole portions thereof extending over an arc of approximately 60 degrees, and preferably over slightly more than 60 degrees.

In Fig. 1 the permanent magnet 1 consists of a bar magnet parallel to the rotor shaft with magnetic pole piece arms 4 and 5 extending from either end, the pole arm 4 being bent in one direction and the other pole piece arm 5 being bent in the opposite direction to bring their pole piece ends in the plane of the rotor 3. The electromagnet 2 also has its core parallel to the shaft with an energizing coil 6 thereon, and with pole piece extensions 7 and 8 from its opposite ends also bent to bring their pole pieces in the plane of the rotor. The magnetic circuits of these magnets are diagrammatically illustrated in Fig. 2, and the construction could conform to Fig. 2.

The rotor is mounted on a shaft 9 with a three-segment commutator 10. The shaft will be mounted in bearings, not shown, and the commutator segments grounded to the shaft, and the shaft will be grounded as indicated in Fig. 1. A single brush 11 bears against the commutator and is contained in a circuit consisting of the energizing coils 6 to one side of a direct current source of supply 12. The other side of source 12 is grounded and hence is connected to the commutator segment through the ground connection. The brush 11 bears against the commutator in such rotative position that when the rotor is in any one of its three possible 120-degree positions corresponding to those represented in Figs. 1 and 2, the circuit of coil 6 will be energized and will be de-energized when the rotor and commutator have advanced 60 degrees from any such three positions. One of the latter positions is represented in dotted lines in Fig. 2.

The motor is further designed so that the field produced by the electromagnet 2 when energized will be stronger than the field produced by the permanent magnet. The most uniform torque results when the electromagnet is designed to be approximately twice as strong as the permanent magnet in its turning influence on the rotor.

It will now be apparent that when the electromagnet is de-energized for any reason, the rotor will turn to the position shown in Figs. 1 and 2, if not already in such position, so as to provide the minimum reluctance path for the permanent magnet flux. When in such position with the electromagnet energized, the rotor will turn clockwise 60 degrees to the position represented in dotted lines in Fig. 2 so as to provide a minimum reluctance path for the stronger electromagnet flux. Upon arriving at such position, the electromagnet is de-energized by the commutator and, hence, the permanent magnet will advance the rotor another 60 degrees to arrive at the position represented in Figs. 1 and 2, whereupon the electromagnet is again energized and the rotary action continues at a speed dependent primarily upon the motor load, the voltage of the source of supply, and the strength of the electromagnet. It will be evident that for best results the commutator segments should be of equal length and spacing and should close and open the circuit of the electromagnet for alternate 60 degrees rotation of the rotor. The outer peripheries of the rotor pole pieces may be of uniform radius and such as to give a minimum practicable air gap, and the pole pieces tapered towards their outer ends, or instead of tapering the rotor pole pieces, I may taper the air gap to provide the variation in reluctance necessary to advance the rotor, or I may do both.

In Fig. 2, I have represented the electromagnet 2 as being energized through a relay switch 13, the switch being closed when the relay is energized and opened when the relay is de-energized. Such relay switch may take the place of the commutator 10 and brush 11 of Fig. 1, and when so connected, the motor serves as an impulse counter with a speed of rotation dependent upon the rate at which impulses are received by the relay from some remote impulsing device.

The invention is not confined to any particular pole numbers in rotor and stator, or to permanent magnets, or to having the peripheral extensions on the rotor poles as will be evident from Fig. 4. In Fig. 4 the number of rotor pole pieces have been increased. Apparently the only limitation in this respect is that they shall be evenly spaced. Two pairs of two-pole stator magnets are used and the stator pole pieces rather than the rotor pole pieces have the peripheral extensions of graduated reluctance. Also the weaker stator field magnets are electromagnets rather than permanent magnets. The rotor is represented at 15 and in this case has eighteen evenly spaced magnetic poles 16 which are integral with the magnet rotor spider. The four stator bipolar electromagnets 17, 18, 19 and 20 may all be alike. Stator electromagnets 17 and 18 which are diametrically opposite each other are energized in series through the 18-segment commutator 21 from a source of supply 22 which can be either a direct current or alternating current source but here represented as a direct current source. The stator pole pieces have peripheral pole piece extensions of graduated reluctance with respect to the rotor, with the ends which have the greatest reluctance all extending in the same direction about the rotor. This determines the direction of rotation, since the stator pole ends having the maximum reluctance will be the leading pole tips. Thus the reduced polar extensions of the stator electromagnets extend in a counterclockwise direction and the direction of motor rotation will be clockwise. In the position of parts represented, electromagnets 17 and 18 have just been energized and advanced the rotor one-half pole space distance where the rotor poles are in a minimum reluctance relation with the stator poles of electromagnets 17 and 18 and having moved to this position, the commutator 21 has opened their energizing circuit. Electromagnets 19 and 20 will now be controlling and since the rotor poles adjacent thereto are in a high reluctance position with respect to the pole pieces of electromagnets 19 and 20, the rotor will move clockwise one-half pole distance to the minimum reluctance position with respect to this pair of stator electromagnets, whereupon the commutator 21 will again close the energizing circuit of electromagnets 17 and 18 which, since they produce the stronger flux, will again advance the rotor one-half pole space distance etc.

By arranging the pairs of stator electromagnets 17 and 18 opposite each other and similarly for electromagnets 19 and 20, there is no unbalanced magnetic pull on the rotor in a direction at right angles to its shaft. Aside from this the placing of the stator electromagnets could be otherwise from that represented. In Fig. 4 instead of making the weaker magnets 19 and 20 permanent magnets, they are electromagnets energized continuously from the same source 22 from which the stronger electromagnets 17 and 18 are energized. However, the weaker electromagnets have an adjustable resistance 23 in their energizing circuit, and hence, the relative strength of the two sets of stator electromagnets may be adjusted to the desired relation for best operation and having been so adjusted, there will be very little change due to voltage variations in the source of supply, since this will influence all electromagnets essentially alike. Proportioning of the relative strength of the constantly energized and intermittently energized electromagnets may also be had by a difference in the number of coil turns or a difference in air gap spacing.

It is further obvious that I may add another pair of stator magnets corresponding to magnets 17 and 18 to the empty spaces about the rotor so as to have four such intermittently energized magnets and keep the two constantly magnetized magnets 19 and 20, but make all magnets of the same strength. The torque of the four intermittently energized magnets when energized will thus be double that of the constantly magnetized magnets and the motor will operate as intended.

The simple, rugged motor of my invention is shown in Fig. 1 for driving an escapement form of clock. The source of supply 12 may be an automobile storage battery and the clock an automobile clock. Between the motor and clock is a hysteresis clutch 14 comprising a diametrically magnetized permanent disk secured to the motor shaft and a circular cup-shaped hardened steel clutch part connected to a shaft on which the escape wheel of the clock is directly secured. The spider of the clutch may be of skeleton formation and does not necessarily need to be of hardened steel or magnetic material. The rim section of this cup must be of a hysteresis magnetic material such as hardened steel. This design of clutch produces no end thrust. As is well known, a hysteresis clutch has a constant torque characteristic at all speeds where there is any slip between the clutch parts. Hence, the motor speed is made sufficiently high so that at all battery 12 voltages the motor will drive its part of the clutch at a speed greater than that of the escapement wheel of the clock for correct time-keeping purposes. The feature of driving an escapement clock through a constant torque clutch is not my invention but is the invention of Robert F. Edgar and is claimed in his application Serial No. 91,525 filed May 5, 1949 concurrently herewith and assigned to the General Electric Company.

What I claim as new and desire to secure by Letters Patent of the United States is:

1. An electric motor comprising a multipolar magnetic rotor with evenly spaced pole pieces, a stator having at least two bipolar magnets with a pole spacing corresponding to the rotor pole spacing and positioned at different points about the rotor to cooperate magnetically with the rotor pole pieces, said stator and rotor pole pieces being relatively shaped to produce a progressively decreasing air gap reluctance characteristic in one direction over a rotor movement corresponding to approximately one-half pole space when a rotor pole is adjacent to and passing by a stator pole, said two stator magnets being spaced apart about the rotor such a distance that when the rotor has a minimum reluctance position with respect to one magnet it has a substantially greater reluctance position but not its maximum reluctance position with respect to the other magnet and vice versa, and means for magnetizing said bipolar stator magnets, one continuously and the other intermittently, the torque produced by the intermittently energized magnet when magnetized predominating over that produced by the constantly magnetized magnet.

2. An electric motor comprising a polar rotor member with a plurality of evenly spaced pole pieces, a stator member having at least two bipolar magnets each adapted to be polarized to have poles of opposite magnetic polarity, the polar spacing of said magnets being equal to the rotor pole spacing and said magnets being positioned at different points about the rotor to have their pole pieces magnetically cooperate with the rotor pole pieces, the periphery of the pole pieces in one of said members being longer than the peripheral length of the pole pieces in the other member, and the pole pieces having the longer peripheral length being shaped to produce a progressively decreasing air gap reluctance in one direction of rotor rotation when adjacent to and passing the pole pieces of the other member over a distance of the order of one-half rotor pole space, the relative positions of said bipolar stator magnets about the rotor being such that when one has a minimum reluctance relation adjacent to and with respect to a pair of consecutive rotor pole pieces the other bipolar member has a substantially greater reluctance relation adjacent to and with respect to another pair of rotor pole pieces and vice versa, means for continuously magnetizing one of said bipolar stator magnets, and means for intermittently magnetizing the other bipolar stator magnet at a substantially greater effective strength such that the continuously magnetized stator member advances the rotor when the other stator member is not magnetized and the intermittently energized stator magnet advances the rotor when magnetized.

3. An electric motor comprising a three-pole magnet rotor, a stator consisting of two bipolar magnets each having a polar spacing equal to the rotor polar spacing and positioned on diametrically opposite sides of the rotor with their pole faces facing the rotor and spaced apart peripherally of the rotor, the rotor pole pieces having pole face extensions in the direction of rotor rotation such that when a rotor pole piece is directly opposite a stator pole piece of one magnet the pole face extension of said rotor pole piece is adjacent to a pole piece of the other magnet, said pole face extensions being designed to produce a progressively increasing air gap reluctance in the direction to which they extend, one of said bipolar magnets being a constant strength permanent magnet and the other being an electromagnet, a source of supply, and a commutating device driven by said motor connected in series relation with said source of supply and electromagnet, said commutating device closing the electromagnet circuit when the rotor pole pieces are in approximate alignment with the pole pieces of the permanent magnet and opening the electromagnet circuit as the rotor pole pieces are in approximate alignment with the pole pieces of the electromagnet, said electromagnet when energized producing a predominating torque as compared to said permanent magnet.

4. An electric motor comprising a rotor having a magnetic spider portion with three equally spaced pole pieces, a stator member having two pairs of pole pieces, means for continuously magnetizing one pair of said stator pole pieces at a uniform strength and at opposite polarity, electromagnetic means for energizing the other pair of stator pole pieces at opposite polarity, the stator pole pieces of one pair being spaced 120 degrees apart adjacent one side of the rotor and the stator pole pieces of the other pair being spaced 120 degrees apart adjacent the diametrically opposite side of the rotor thereby leaving a spacing between adjacent stator pole pieces of different pairs of 60 degrees, the pole pieces of the rotor extending over an arc of the order of 60 degrees, the magnetic reluctance between stator and rotor pole pieces being greater at the leading portion of the rotor pole pieces than at the trailing portion, and means for intermittently energizing said electromagnetic means such that that pair of stator pole pieces magnetized thereby has a greater maximum magnetic strength than the continuously magnetized pair of stator pole pieces.

5. An electric motor comprising a rotor having three equally spaced magnetic pole pieces and a stator having four pole pieces, a permanent magnet for energizing two of said stator pole pieces at opposite polarities, an electromagnet for energizing the other two stator pole pieces at opposite polarities, the permanent magnet pole pieces being spaced apart adjacent one portion of the rotor a distance corresponding to the rotor pole spacing and the electromagnetic pole pieces being spaced apart a corresponding distance adjacent a diametrically opposite part of the rotor, said rotor pole pieces extending in a peripheral direction a distance sufficient to bridge between a permanent magnet pole piece and an electromagnet pole piece which are adjacent to each other and having an air gap relation such that when in such bridging relation the reluctance between the bridging rotor pole piece and the bridged stator pole pieces is greatest at the leading edge of such rotor pole piece, and means for intermittently energizing said electromagnet such that its magnetic strength action on the rotor when energized exceeds that of the permanent magnet.

FLOYD O. DE MILLAR.

REFERENCES CITED

The following references are of record in the file of this patent:

UNITED STATES PATENTS

| Number | Name | Date |
|---|---|---|
| 830,801 | Mortimer | Sept. 11, 1906 |
| 1,702,342 | Gleerup-Moller | Feb. 19, 1929 |
| 1,863,294 | Bogia | June 14, 1932 |
| 2,499,316 | Johnson | Feb. 28, 1950 |

FOREIGN PATENTS

| Number | Country | Date |
|---|---|---|
| 522,557 | Great Britain | June 20, 1940 |
| 791,348 | France | Sept. 23, 1935 |